(12) United States Patent
Ho et al.

(10) Patent No.: US 9,407,893 B1
(45) Date of Patent: Aug. 2, 2016

(54) METHOD TO RECORD A MEDIA FILE

(71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP LAB, INC., Palo Alto, CA (US)

( * ) Notice: Subject to any disclaimer, the term of this patent is extended or adjusted under 35 U.S.C. 154(b) by 0 days.

(21) Appl. No.: 14/289,527

(22) Filed: May 28, 2014

Related U.S. Application Data (63) Continuation of application No. 11/351,803, filed on Feb. 10, 2006, now Pat. No. 8,774,602.

(51) Int. Cl.
*H04N 9/88* (2006.01)
*H04N 9/804* (2006.01)

(52) U.S. Cl.
CPC ................................. *H04N 9/8042* (2013.01)

(58) Field of Classification Search
CPC . H04N 9/8042; H04N 21/812; H04N 9/7908; G11B 27/22
USPC .......... 386/207, 263, 264, 270, 297; 370/216; 714/746, 748; 725/32, 36, 136
See application file for complete search history.

(56) References Cited

U.S. PATENT DOCUMENTS

| | | | | |
|---|---|---|---|---|
| 2002/0100062 A1* | 7/2002 | Lowthert | ............. | H04N 5/4401 725/136 |
| 2004/0010595 A1* | 1/2004 | Hiranaka | ...................... | 709/227 |
| 2005/0022089 A1* | 1/2005 | Le et al. | ........................ | 714/749 |
| 2006/0045470 A1* | 3/2006 | Poslinski | ........... | H04N 5/44513 386/297 |

* cited by examiner

*Primary Examiner* — Thai Tran
*Assistant Examiner* — Mishawn Hunter
(74) *Attorney, Agent, or Firm* — North Shore Patents, P.C.; Michele Liu Baillie (57) ABSTRACT

A method and system for recording a media file, include a recorder and a player. The recorder receives in real time a first content of the media file; stores the first content in a recorded media file; and determines that the recorded media file includes a hole. The player plays in real time the recorded media file including the hole. The recorder then receives a second file data packet which includes a second content of the media file to fill the hole, and stores the second content in the recorded media file. The recorded media file can be replayed with the filled hole. During the replay, more content of the media file is played than during the first play.

18 Claims, 7 Drawing Sheets

Player plays recorded media file after a hole is filled

Figure 1. A System to Play & Record a Media File

Figure 2. A Process to Record a File Segment

Figure 3. A Process to Record Multiple File Segments

Figure 4. Player plays a Recorded Media File with a Hole

Figure 5. Recorder fills a hole after Player plays the hole

Figure 6. Player plays recorded media file after a hole is filled

Figure 7. A Process for Recorder to inform about a Hole

METHOD TO RECORD A MEDIA FILE

CROSS-REFERENCE TO RELATED APPLICATIONS

The present application is a continuation of co-pending U.S. patent application Ser. No. 11/351,803, filed on Feb. 10, 2006.

BACKGROUND OF THE INVENTION

1. Field

This invention relates generally to media, and more specifically to a method to record a media file.

2. Related Art

When video cassette recorder (VCR) was first introduced, consumer flocked to purchase one so that they can record television programs. Typically a user would record her favorite show and watches the recording at a later time. Sometimes, she is watching a television program while she is recording the same program so that she can watch the program again in a future time. The recording mechanism of a VCR is to record signals received by the VCR. If there is a glitch in television broadcast, causing for example a snow screen, or blurry pictures, the VCR records the snow screen and the blurry pictures. The replay of the recording would thus be no better than the playing of the original broadcast.

As video transmission migrates to using data networks, transmission of signal uses data packets. However, the basic recording mechanism remains unchanged. For example, a digital VCR records television programs transmitted through a data network, for example IPTV. If there is a glitch in the transmission, such as missing packets, the digital VCR records some predetermined or arbitrary data in place of the missing data. During the viewing of the television program, a user sees snow screen or blurry pictures. When the user replays the recorded program on the digital VCR, the user also sees the snow screen or blurry pictures. Certainly a user desires the recorded program to be perfect, containing neither snow screen nor blurry pictures.

BRIEF SUMMARY OF THE INVENTION

A method and system for recording a media file, include a recorder and a player. The recorder receives in real time a first content of the media file; stores the first content in a recorded media file; and determines that the recorded media file includes a hole. The player plays in real time the recorded media file including the hole. The recorder then receives a second content of the media file to fill the hole, and stores the second content in the recorded media file. The recorded media file can be replayed with the filled hole. During the replay, more content of the media file is played than during the first play.

DETAILED DESCRIPTION OF THE INVENTION

Figure 1:
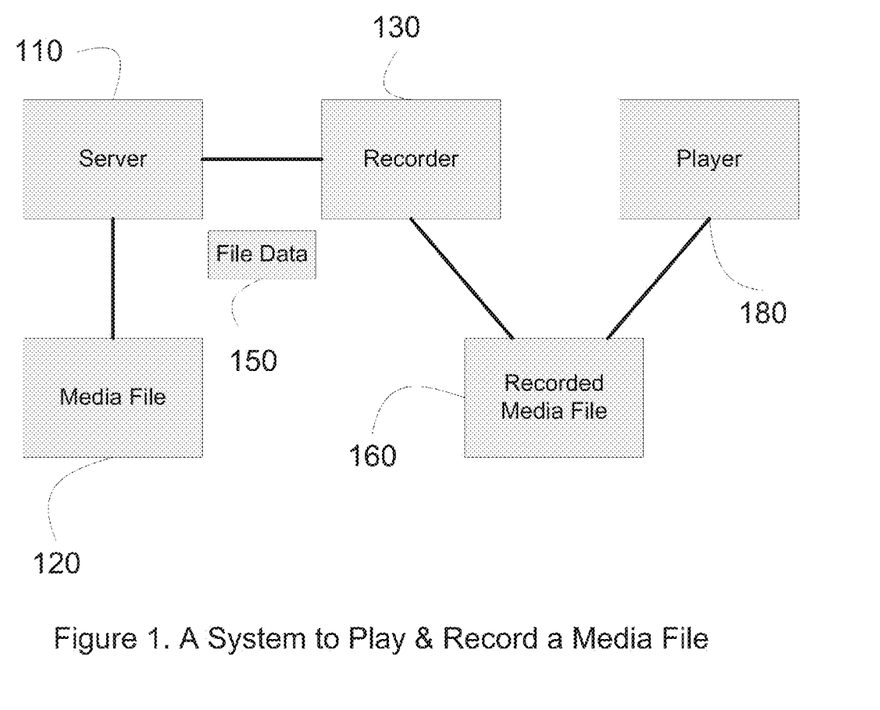
FIG. 1 illustrates a scenario where a recorder records content of a media file from a server, while a player is playing the content.

FIG. 1 illustrates a scenario where a recorder records content of a media file from a server, while a player is playing the content.

In one embodiment, a media file 120 is an audio file, such as a song, a speech, recorded sound, or audio clip. In one embodiment, a media file 120 is a video file, such as a movie, an animation clip, a video clip, a television program recording, or a video recording. In one embodiment, a media file 120 is a television broadcast, or a radio broadcast. In one embodiment, a media file 120 is a live concert, televised sport event, live news broadcast. In one embodiment, a media file 120 is an article, such as a book, a piece of news, written paper, spreadsheet, or presentation slides. In one embodiment, a media file 120 is a picture, such as a photo, graphical image, graph, or table.

Recorder 130 receives file data 150 about a media file 120 from a server 110. File data 150 includes content of media file 120. Recorder 130 then records content of media file 120 into a recorded media file 160. In one embodiment, the content includes the entire content of media file 120. In another embodiment, the content includes a portion of the content of media file 120. Player 180 plays content of media file 120. In one embodiment, Player 180 plays content of media file 120 from the recorded media file 160 at the same time as recorder 130 is recording the recorded media file 160. In one embodiment, player 180 plays the content from the recorded media file 160 at a different time.

Figure 2:
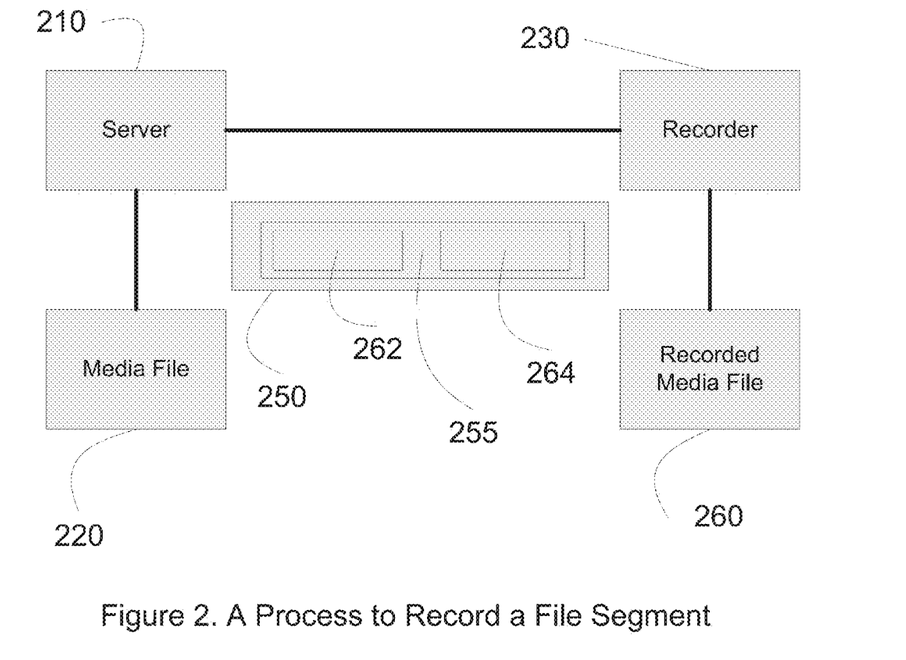
FIG. 2 illustrates a process to record a file segment of a media file.

FIG. 2 illustrates a process to record a file segment of a media file. Recorder 230 communicates with server 210 over a communication channel. Server 210 sends file data 250 containing information for a media file 220 to recorder 230. In one embodiment, the file data 250 includes a file data packet 255. File data packet 255 includes a file segment 262 of media file 220, and a file segment location 264. In one embodiment, the file segment location 264 is a byte offset indicator. In other embodiments, the file segment location 264 is a time, a fixed location, or a relative location. File segment location 264 indicates the location in media file 220 where file segment 262 resides. In one embodiment, file segment 262 includes a contiguous block of content of media file 220. The size of file segment 262 is the size of the content. For example, file segment 262 includes 1000 bytes of the content of media file 220. File segment 262 is said to be of size 1000 bytes.

Recorder 230 receives file data packet 255. Recorder 230 obtains file segment 262 and file segment location 264 from file data packet 255. Recorder 230 places file segment 262 in recorded media file 260 at the location indicated by file segment location 264.

Figure 3:
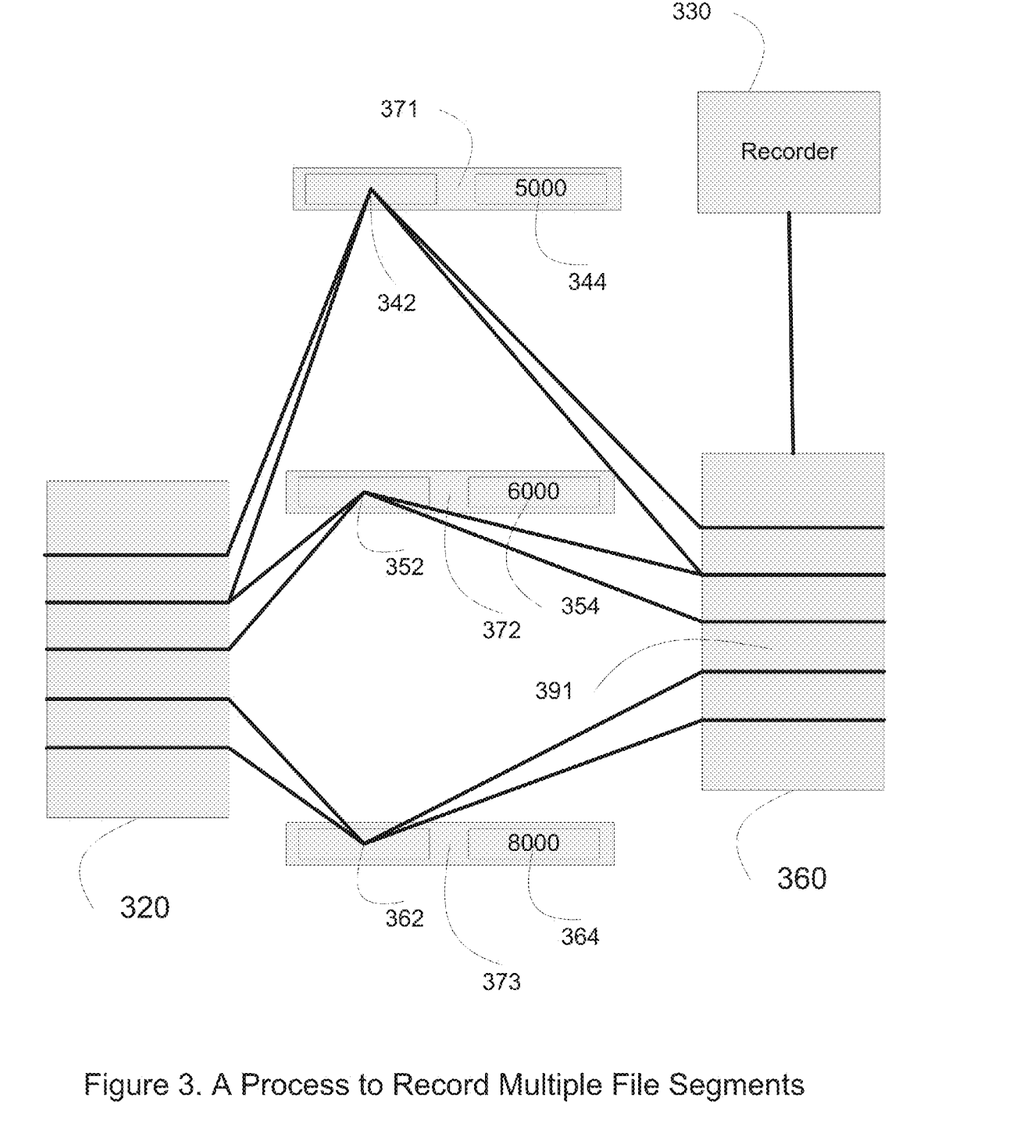
FIG. 3 illustrates a process to record a plurality of file segments of a media file.

FIG. 3 illustrates a process to record a plurality of file segments of a media file. Recorder 330 receives a plurality of file data packets 371, 372, 373. File data packet 371 includes file segment location 344 at location 5000 of media file 320, and file segment 342 of 1000 bytes. File data packet 372 includes file segment location 354 at location 6000 of media file 320, and file segment 352 of size 1000 bytes. File data packet 373 includes file segment location 364 at location 8000 of media file 320, and file segment 362 of size 1000 bytes.

Recorder 330 places the file segments 342, 352, 362 into recorded media file 360. Recorded media file 360 includes a file segment hole 391 at location 7000. Hole 391 has a size of 1000 bytes. Recorded media file 360 contains less content than media file 320. A "hole", as used in this specification, refers to missing portions or gaps in a recorded media file in comparison to the media file.

Figure 4:
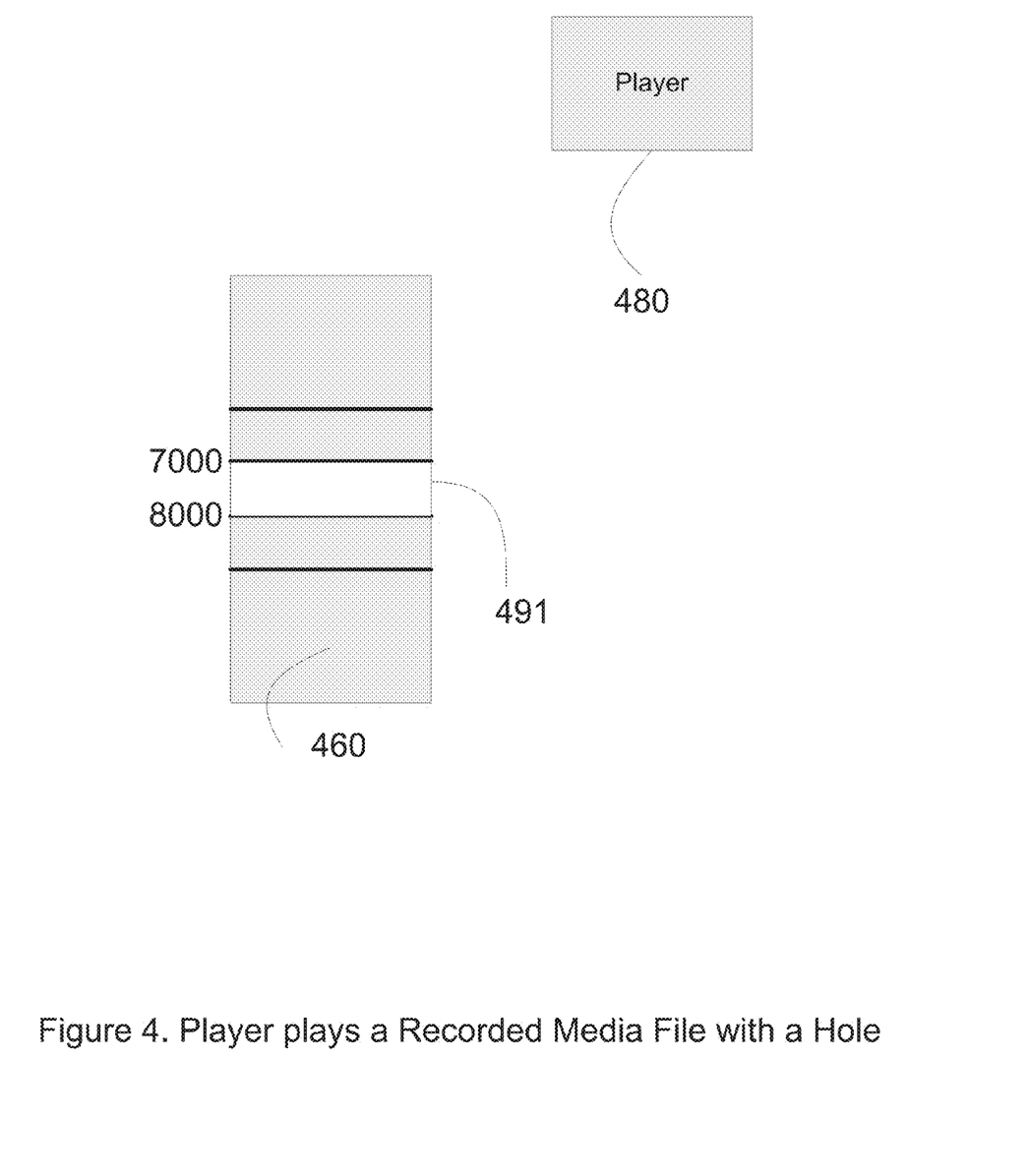
FIG. 4 illustrates a process where a player plays a in a recorded media file.

FIG. 4 illustrates a process where a player plays a hole in a recorded media file. Recorded media file 460 includes a hole 491 at location 7000. The hole 491 has a size of 1000 bytes. Player 480 plays content from recorded media file 460. In one embodiment, player 480 just completes playing the content of recorded media file 460 before location 7000. Player 480 cannot obtain the content of recorded media file 460 at location 7000. In one embodiment, player 480 skips the hole 491 and plays the content of recorded media file 460 at location 8000. In another embodiment, player 480 plays other content for some duration. In a different embodiment, player 480 plays again earlier played content of recorded media file 460. In one embodiment, player 480 resumes playing content of recorded media file 460 at or after location 8000. In one embodiment, player 480 plays a pre-selected content. Examples of noise include advertisement, busy signal, or no signal. In one embodiment, player 480 plays noise.

Figure 5:
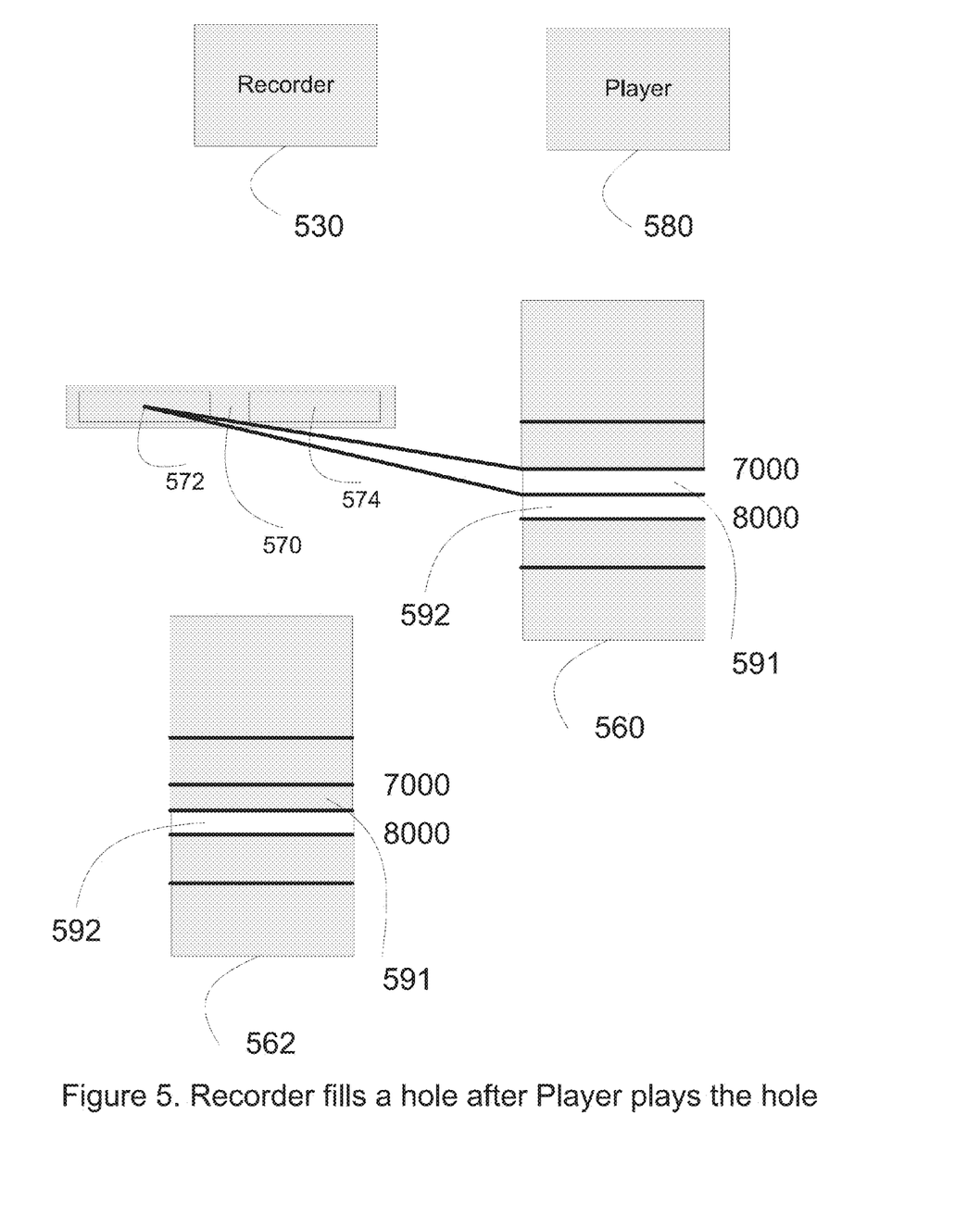
FIG. 5 illustrates a process where a recorder fills a hole in a recorded media file after a player plays the hole in the recorded media file.

FIG. 5 illustrates a process where a recorder fills a hole in a recorded media file after a player plays the hole in the recorded media file. Recorded media file 560 includes hole 591 at location 7000. Hole 591 is of size 1000 bytes.

After player 580 plays hole 591 of recorded media file 560, recorder 530 receives a file data packet 570. File data packet 570 includes a file segment 572 and a file segment location 574. File segment 572 and file segment location 574 allow recorder 530 to fill hole 591. Recorder 530 places file segment 572 into recorded media file 560. Recorded media file 562 represents the recorded media file 560 after recorder 530 places file segment 572.

Recorded media file 562 contains more content than recorded media file 560. In one embodiment, recorder 530 partially fills hole 591 with file segment 572. Recorded media file 562 includes a plurality of holes 592 between location 7000 and location 8000. The plurality of holes 592 is a part of hole 591. In another embodiment, recorder 530 completely fills hole 591. Recorded media file 562 does not have a hole between location 7000 and location 8000.

Figure 6:
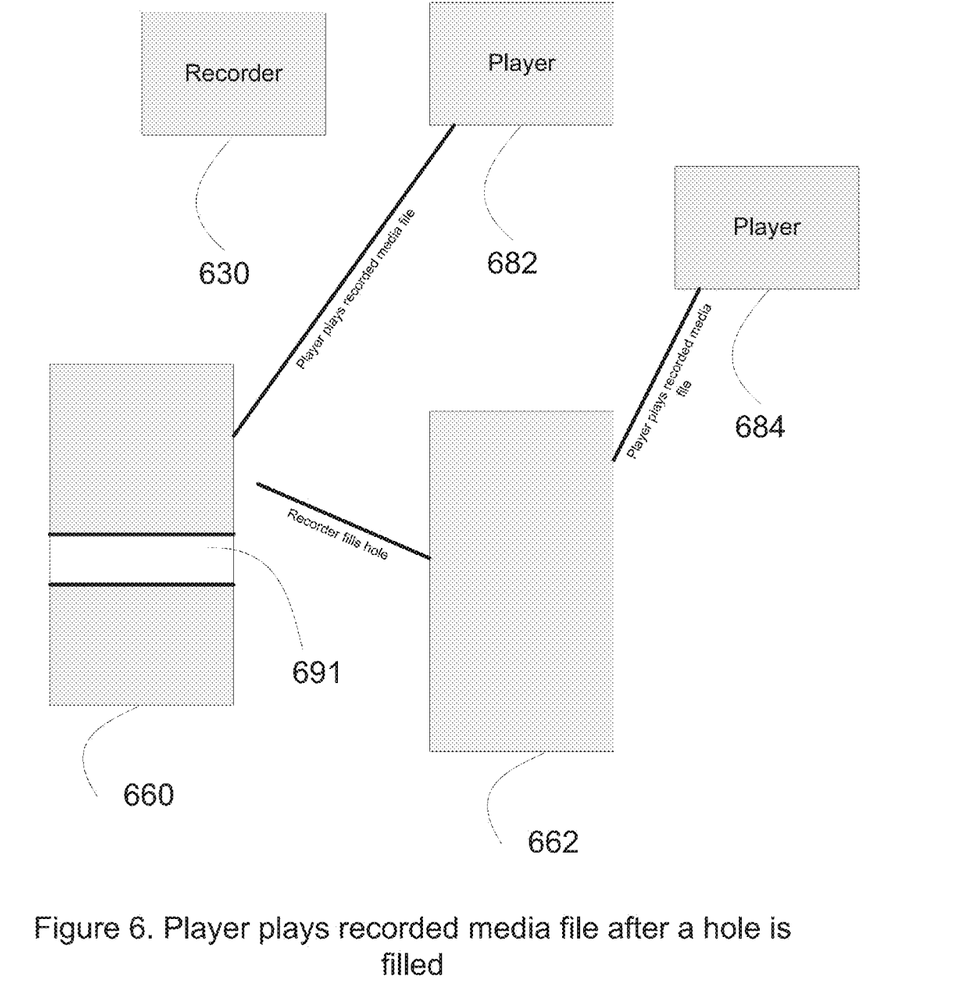
FIG. 6 illustrates a process of playing a recorded media file after a hole is filled.

FIG. 6 illustrates a process of playing a recorded media file after a hole is filled. Recorder 630 is recording recorded media file 660. Recorded media file 660 includes a hole 691. A first player 682 plays recorded media file 660 with hole 691. Recorder 630 fills hole 691, as illustrated in FIG. 5. Recorded media file 662 is recorded media file 660 after recorder 630 fills hole 691. Recorded media file 662 includes more content than recorded media file 660. A second player 684 plays recorded media file 662. Player 684 plays with a better quality than player 682.

Figure 7:
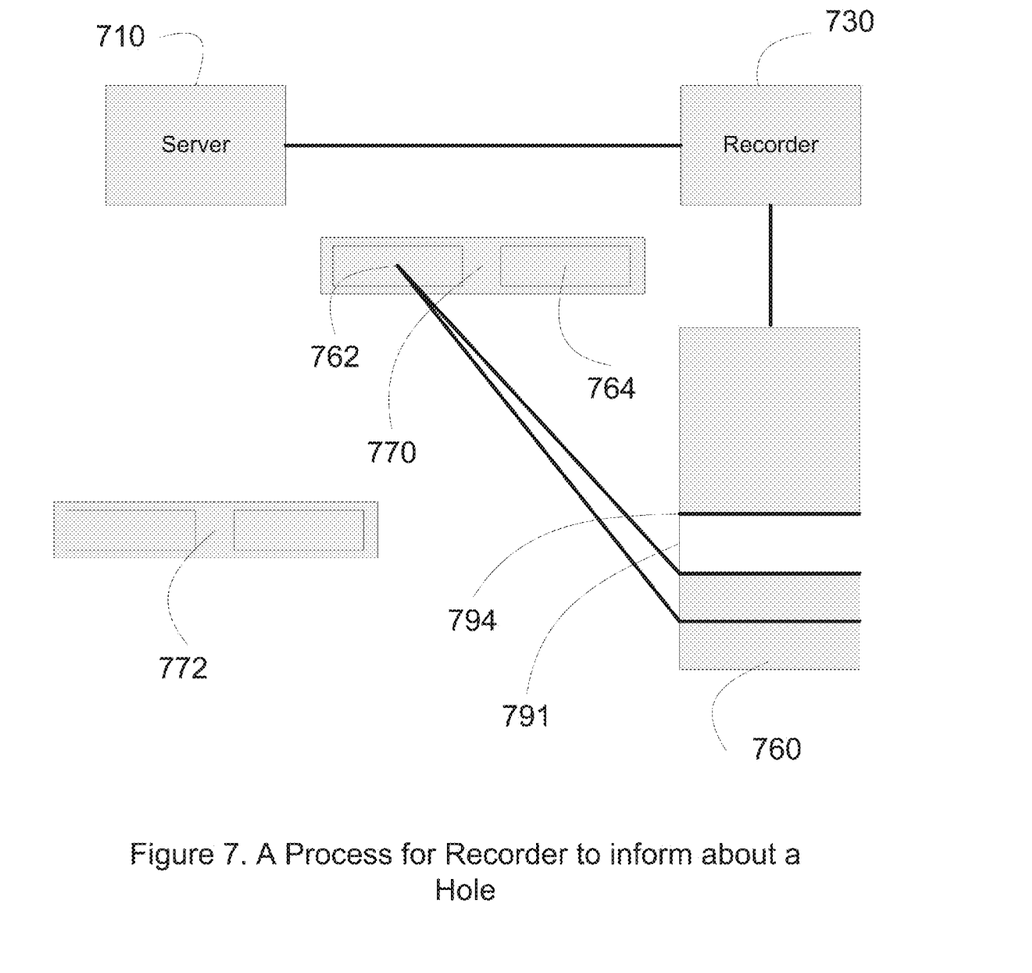
FIG. 7 illustrates a process where a recorder informs a server about a hole.

FIG. 7 illustrates a process where a recorder informs a server about a hole.

Recorder 730 records recorded media file 760. Recorder 730 receives a file data packet 770. File data packet 770 includes file segment 762 and file segment location 764. Recorder 730 places file segment 762 into recorded media file 760 at file segment location 764. Recorder 730 determines there's a hole 791 of recorded media file 760. Hole 791 is at location 794 of recorded media file 760. In one embodiment, Recorder 730 determines there's a hole 791 after placing the file segment 762.

Recorder 730 sends to server 710 information about hole 791. In one embodiment, recorder 730 sends the location 794 of hole 791. In another embodiment, recorder 730 sends the location 794 and the size of hole 791.

In one embodiment, recorder 730 receives a file data packet 772 that fills hole 791 after recorder 730 sends to server 710 information about hole 791. In one embodiment, server 710 sends the file data packet 772 as a response to the information sent by recorder 730. In one embodiment, the file data packet 772 is automatically received by the recorder 730 without sending to server 710 information about the hole 791. For example, file data packet 772 arrives at the recorder 730 after the hole 791 is played.

A Recording System

In one embodiment, a recording system includes a recorder and a player. The recording system receives, in real time, content of a media file from file data sent from a server. The recording system plays, in real time, content of the media file. The recording system, at the same time, records content of the media file into a recorded media file. In one embodiment, the recording system receives content of media file with a hole. For example, the hole is caused by missing one or more file data packets, one or more corrupted file data packets, or a temporary disconnection between the recording system and the server. The recording system plays the hole. The recording system detects and informs the server about the hole. The server sends file data containing content filling the hole. In one embodiment, the server sends the file data filling the hole after the recording system plays the hole. The recording system records the content of the file data at the location of the hole. The recording system does not play content of the file data that fills the hole. The recording system records more content of the media file than the amount of content of the media file played by the recording system.

A Media Playing System

In one embodiment, a media playing system includes a recorder and a player. The media playing system receives a media file from a server. The media playing system plays content of media file multiple times. In one embodiment, the media playing system plays content of media file the first time when the media playing system is receiving the content. The media playing system plays the second time content of media file after the media playing system records content of media file. In one embodiment, during the first play, the media playing system receives content of the media file with a hole. For example, the hole is caused by missing one or more data packets, one or more corrupted data packets, a temporary disconnection between the recording system and the server. The media playing system plays the hole. The media playing system detects and informs the server about the hole. The server sends file data containing content filling the hole. In one embodiment, the server sends the file data filling the hole after the media playing system plays the hole. The media playing system does not play content of the file data that fills the hole. The media playing system records the content of the file data at the location of the hole. The media playing system records more content of media file than the amount of content of media file played by the media playing system during the first play. During the second play, the media playing system plays content from the recorded media file. The media playing system plays, during the second play, more content of media file than the amount of content of media file played during the first play.

Recorder to Server Communication

In one embodiment, the communication channel between recorder and server includes a data network, media transmission network, television broadcasting network, television transmission network, cable network, local area network, or wide area network. In another embodiment, the communication channel includes an application programming interface, function call, or remote procedure call.

In a scenario, recorder receives file data from server. In another scenario, recorder sends to server information about a hole. In yet another scenario, recorder receives file data from server as a response to the information about a hole. In one embodiment, recorder communicates to different modules in a server for the plurality of scenarios. Recorder may communicate to the different server modules using different communication channels.

Recorded Media File

In one embodiment, recorded media file is stored in data storage such as a hard disk, flash memory, removable storage such as a digital video disc, or cassette. A player plays a recorded media file by retrieving from the data storage.

In one embodiment, player plays content of media file from the file data received by recorder. In one embodiment, player also receives the file data from server. Server sends the file data to both recorder and player.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for recording a live televised event over a data network comprising:
   (a) receiving the live televised event by a media system, wherein the live televised event comprises a first content and a second content different from the first content, wherein the received live televised event comprises the first content and a hole for a missing second content;
   (b) while receiving the live televised event, playing the received live televised event comprising the hole and the first content by the media system;
   (c) storing the first content in a media file by the media system;
   (d) determining a time location in the received live televised event at which the hole resides and a time duration of the hole by the media system;
   (e) sending the time location to a server by the media system over the data network;
   (f) receiving from the server the second content of the live televised event over the data network corresponding to the time location and the time duration of the hole by the media system; and
   (g) storing the second content in the stored media file corresponding to the time location by the media system.

2. The method of claim 1, wherein the storing (c) further comprises:
   (c1) storing an indication of the time location of the hole in the media file.

3. The method of claim 1, wherein the sending (e) further comprises:
   (e1) sending the time duration of the hole to the server.

4. The method of claim 1, wherein the live televised event comprises one or more of the following: a concert; a sporting event; a news event; a presentation; a movie; a television program; a television broadcast; and a radio broadcast.

5. The method of claim 1, wherein the receiving (a) comprises:
   (a1) receiving by the media system, over a communication session between the media playing system and a second server, one or more video data packets comprising:
   one or more first video segments of the live televised event comprising the first content; and
   one or more first video segment locations for indicating locations in the live televised event where the first video segments reside.

6. The method of claim 1, wherein the playing (b) comprises:
   (b1) playing another content for at least a same time duration as the time duration of the hole by the media system.

7. The method of claim 1, further comprising:
   (h) after storing the second content, playing the stored media file comprising the first content and the second content.

8. The method of claim 1, wherein the determining (d) comprises:
   (d1) determining the stored media file includes the hole at the time location in the received live televised event by the media system; and
   (d2) determining the time duration of the hole by the media system.

9. A system, comprising:
   a recorder for receiving a live televised event, wherein the live televised event comprises a first content and a second content different from the first content, wherein the received live televised event comprises the first content and a hole for a missing second content;
   a player for playing, while receiving the live televised event, the received live televised event comprising the hole and the first content,
   wherein the recorder stores the first content in a media file,
   wherein the recorder determines a time location in the received live televised event at which the hole resides and a time duration of the hole,
   wherein the recorder sends the time location to a server over the data network,
   wherein the recorder receives from the server the second content of the live televised event over the data network corresponding to the time location and the time duration of the hole, and
   wherein the second content is stored in the stored media file corresponding to the time location.

10. The system of claim 9, wherein an indication of the time location of the hole is stored in the media file.

11. The system of claim 9, wherein the recorder sends the time duration of the hole to the server.

12. The system of claim 9, wherein the live televised event comprises one or more of the following: a concert; a sporting event; a news event; a presentation; a movie; a television program; a television broadcast; and a radio broadcast.

13. The system of claim 9, wherein the recorder receives, over a communication session between the media playing system and a second server, one or more video data packets comprising:
   one or more first video segments of the live televised event comprising the first content; and one or more first video segment locations for indicating locations in the live televised event where the first video segments reside.

14. The system of claim 9, wherein the player plays another content for at least a same time duration as the time duration of the hole.

15. The system of claim 9, wherein after storing the second content, the player plays the stored media file comprising the first content and the second content.

16. The system of claim 9, wherein in the determining the time location in the received live televised event at which the hole resides and the time duration of the hole, the recorder:
   determines the stored media file includes the hole at the time location in the received live televised event; and
   determines the time duration of the hole.

17. A system, comprising:
   a server; and
   a recorder for receiving a live televised event, wherein the live televised event comprises a first content and a second content different from the first content, wherein the received live televised event comprises the first content and a hole for a missing second content, wherein the received live televised event is be played while being received;
   wherein the recorder stores the first content in a media file,
   wherein the recorder determines a time location in the received live televised event at which the hole and a time duration of the hole,
   wherein the recorder sends the time location to the server over the data network,
   wherein the recorder receives from the server the second content of the live televised event over the data network corresponding to the time location and the time duration of the hole, and
   wherein the second content is stored in the stored media file corresponding to the time location.

18. The system of claim 17, further comprising:
   a player for playing, while receiving the live televised event, the received live televised event comprising the hole and the first content.

* * * * *